US012580927B2

(12) United States Patent
Duan et al.

(10) Patent No.: US 12,580,927 B2
(45) Date of Patent: Mar. 17, 2026

(54) DETECTING AND PROTECTING CLAIMABLE NON-EXISTENT DOMAINS

(71) Applicant: Palo Alto Networks, Inc., Santa Clara, CA (US)

(72) Inventors: Ruian Duan, Santa Clara, CA (US); Zhanhao Chen, Sunnyvale, CA (US); Janos Szurdi, Santa Clara, CA (US); Daiping Liu, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 216 days.

(21) Appl. No.: 18/228,357

(22) Filed: Jul. 31, 2023

(65) Prior Publication Data

US 2025/0047687 A1 Feb. 6, 2025

(51) Int. Cl.
*G06F 21/00* (2013.01)
*H04L 9/40* (2022.01)

(52) U.S. Cl.
CPC ...... *H04L 63/1416* (2013.01); *H04L 63/0263* (2013.01); *H04L 63/1425* (2013.01)

(58) Field of Classification Search
CPC ............. H04L 63/1416; H04L 63/0263; H04L 63/1425; H04L 63/0236; H04L 61/4511; H04L 63/1408
See application file for complete search history.

(56) References Cited

U.S. PATENT DOCUMENTS

| | | | | |
|---|---|---|---|---|
| 2015/0256424 A1* | 9/2015 | Kaliski, Jr. | ............. | H04L 61/10 |
| | | | | 709/224 |
| 2016/0277438 A1* | 9/2016 | Xie | ..................... | H04L 63/1425 |
| 2017/0163603 A1 | 6/2017 | Xu | | |
| 2017/0171242 A1* | 6/2017 | Akcin | ................. | H04L 63/1466 |
| 2018/0262520 A1* | 9/2018 | Xu | ........................ | H04L 63/1425 |
| 2019/0253384 A1* | 8/2019 | Furuta | ................. | H04L 61/4511 |
| 2021/0250332 A1 | 8/2021 | Moore | | |
| 2021/0400061 A1* | 12/2021 | Antoniewicz | ....... | H04L 61/4511 |
| 2022/0182345 A1* | 6/2022 | Birch | .................... | H04L 51/214 |

FOREIGN PATENT DOCUMENTS

| | | | |
|---|---|---|---|
| TW | 202311994 A | * | 3/2023 |

OTHER PUBLICATIONS

Liu et al., Dangling Domains: Security Threats, Detection and Prevalence, Palo Alto Networks, Sep. 16, 2021, 14 pages, https://web.archive.org/web/20230531 001756/https://unit42.paloaltonetworks.com/dangling-domains/.
Chen, et al. "Client-side name collision vulnerability in the new gtld era: A systematic study." Proceedings of the 2017 ACM SIGSAC Conference on Computer and Communications Security. 2017.
Chen, et al. "MitM attack by name collision: Cause analysis and vulnerability assessment in the new gTLD era." 2016 IEEE Symposium on Security and Privacy (SP). IEEE, 2016.

* cited by examiner

*Primary Examiner* — Michael M Lee
(74) *Attorney, Agent, or Firm* — Van Pelt, Yi & James LLP

(57) ABSTRACT

Techniques for detecting and protecting claimable non-existent domains are disclosed. A system, process, and/or computer program product for detecting and protecting claimable non-existent domains includes monitoring network activity using a network security device, detecting that a session is querying a claimable non-existent domain using a domain name system (DNS) security service, and performing an action in response to the session querying the claimable non-existent domain.

16 Claims, 14 Drawing Sheets

900

910

MONITOR NETWORK ACTIVITY USING
NETWORK SECURITY DEVICE

920

DETECT THAT SESSION IS QUERYING
CLAIMABLE NXDOMAIN

930

PERFORM ACTION IN RESPONSE TO
SESSION QUERYING CLAIMABLE
NXDOMAIN

1000

1010
IDENTIFY POTENTIALLY CLAIMABLE NXDOMAINS

1020
PERFORM HIGH IMPACT CHECK ON POTENTIALLY CLAIMABLE NXDOMAINS

1030
PERFORM CLAIMABILITY CHECK ON HIGH IMPACT NON-EXISTENT DOMAINS

1040
PERFORM INTERNAL RESOLVABILITY CHECK ON VULNERABLE NXDOMAINS

1050
PERFORM REGISTRATION CHECK ON VULNERABLE NXDOMAINS

1100

1110

CHECK SERVER-SIDE SOURCE

1120

CHECK CLIENT-SIDE SOURCE

1400

DETECTING AND PROTECTING CLAIMABLE NON-EXISTENT DOMAINS

BACKGROUND OF THE INVENTION

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, Trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
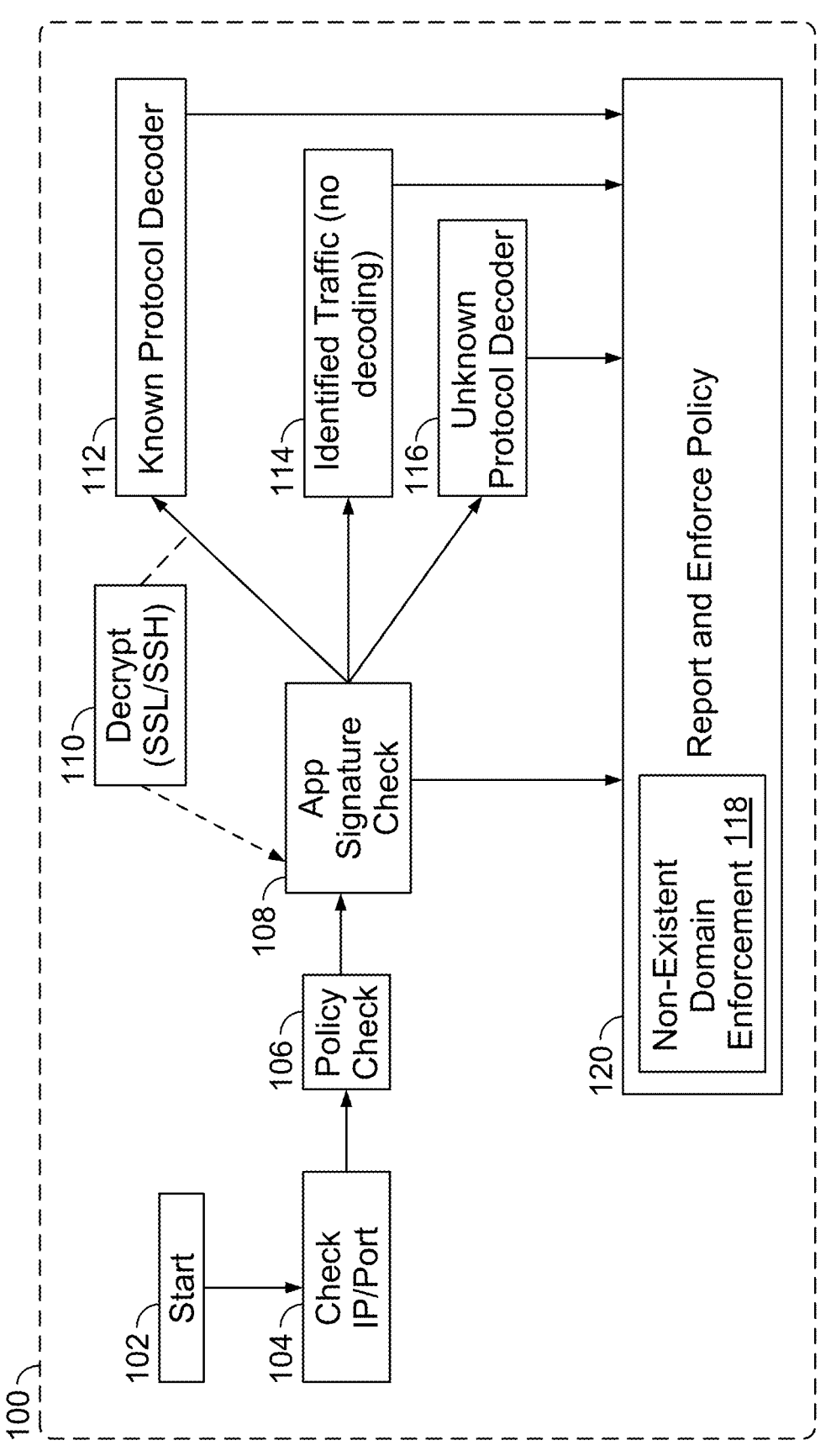
FIG. 1 is a functional diagram of an architecture of a security device that can be used for detecting and protecting claimable non-existent domains in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, a system/method/computer program product for detecting and protecting claimable non-existent domains includes monitoring network activity using a network security device, detecting that a session is querying a claimable non-existent domain (NXDOMAIN) using a domain name system (DNS) security service, and performing an action in response to the session querying the claimable NXDOMAIN.

In some embodiments, the detecting that the session is querying the claimable NXDOMAIN comprises: performing a high impact check.

In some embodiments, the detecting that the session is querying the claimable NXDOMAIN includes performing a high impact check, including: performing one or more of the following: checking a server-side source to identify a high impact NXDOMAIN; and/or checking a client-side source to identify a high impact NXDOMAIN.

In some embodiments, the server-side source includes a telemetry log, a passive DNS log, a DNS zone file, or any combination thereof.

In some embodiments, the client-side source includes an email domain list and/or a Whois database for determining recently expired domains.

In some embodiments, the client-side source includes a telemetry log for determining domains having more than N customers or M visits and/or a passive DNS log for determining domains having more than N customers or M visits.

In some embodiments, the detecting that the session is querying the claimable NXDOMAIN includes performing a claimability check for a candidate claimable NXDOMAIN.

In some embodiments, the detecting that the session is querying the claimable NXDOMAIN includes performing an internal resolvability check for a candidate claimable NXDOMAIN.

In some embodiments, the detecting that the session is querying the claimable NXDOMAIN includes performing a registration check for a candidate claimable NXDOMAIN.

In some embodiments, the claimable NXDOMAIN includes a root domain that is not registered or claimed and/or a rentable subdomain that is not registered or claimed.

In some embodiments, the action includes one or more of the following: block query, block a response to the claimable NXDOMAIN, alert an administrator, quarantine a source device querying the claimable NXDOMAIN, log a source device querying the claimable NXDOMAIN, and/or register the claimable NXDOMAIN.

FIG. 1 is a functional diagram of an architecture of a security device that can be used for detecting and protecting claimable non-existent domains in accordance with some embodiments. As shown in FIG. 1, network traffic is monitored at a firewall 100. In some embodiments, network traffic is monitored using a data appliance (e.g., a data appliance that includes security functions, such as a security device/appliance that includes a firewall). In some embodiments, network traffic is monitored using a gateway (e.g., a gateway that includes security functions, such as a security gateway). In some embodiments, the network traffic is monitored using pass through (e.g., in line) monitoring techniques.

In some embodiments, network traffic is monitored using a state-based firewall. In some embodiments, the state-based firewall can monitor traffic flows using an APP-ID engine (e.g., App Signature Check & User ID Check 108). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. In some embodiments, user identification is then determined (e.g., user ID can be deduced based on the source IP address). A policy check engine 106 determines whether any policies can be applied based on the IP address and port number. As also shown in FIG. 1, an application signature check engine 108 identifies an application (e.g., using an APP-ID engine using various application signatures for identifying applications based on packet flow analysis). For example, APP-ID engine 108 can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 112, 114, and 116, to decode the classified traffic for each monitored session's traffic flow. If the monitored traffic is encrypted (e.g., encrypted using HTTPS, SSL, SSH, or another known encryption protocol), then the monitored traffic can be decrypted using a decrypt engine 110 (e.g., applying trusted man-in-the-middle techniques using a self-signed certificate). A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

In some embodiments, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and/or other information to match signatures (e.g., file-based, protocol-based, and/or other types/forms of signatures for detecting malware or suspicious behavior).

In some embodiments, firewall 100 also includes a content-ID engine (not shown), and, in some embodiments, the content-ID engine's identified content is also used by report and enforce policy engine 120, possibly in various combinations with other information, such as application, user, and/or other information, to enforce various security/firewall policies/rules.

In some embodiments, firewall 100 also includes a non-existent domain enforcement engine 118 for detecting and protecting claimable non-existent domains.

Figure 2:
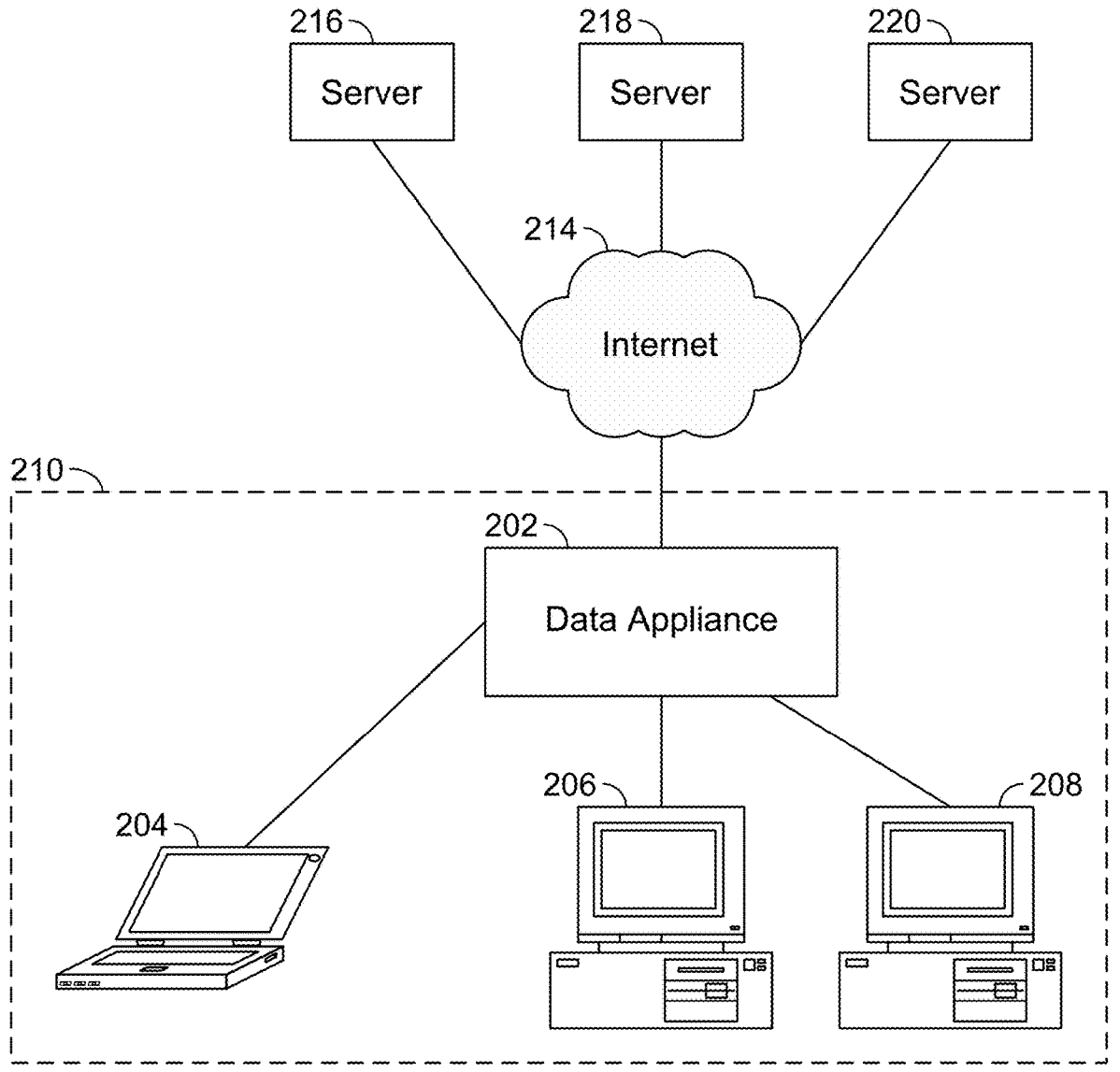
FIG. 2 is a block diagram of a network architecture that can be used for detecting and protecting claimable non-existent domains in accordance with some embodiments.

FIG. 2 is a block diagram of a network architecture that can be used for detecting and protecting claimable non-existent domains in accordance with some embodiments. As shown, a data appliance 202 (e.g., a data appliance that includes security functions, such as a security appliance/device that includes a firewall, a gateway that includes security functions, such as a security gateway, and/or any other device that includes a firewall function as described herein) is at the perimeter of a protected network 210, which includes clients 204, 206, and 208. Data appliance 202 includes a firewall function to protect the network and clients within the protected network 210, which is in communication with the Internet 214 and various servers, such as servers 216, 218, and 220 (e.g., web servers, mail servers, file servers, and/or other types of servers).

Figure 3:
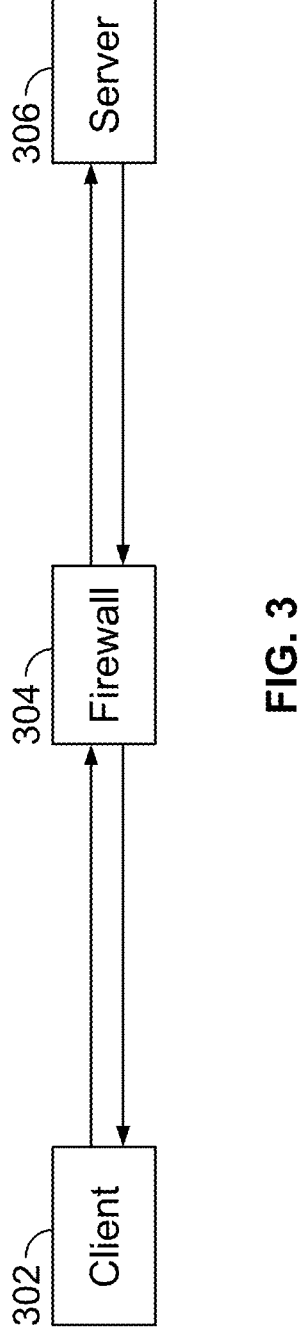
FIG. 3 is a functional block diagram illustrating a session passing through a firewall.

FIG. 3 is a functional block diagram illustrating a session passing through a firewall. As shown, a client 302 establishes a session with a remote server 306 via a firewall device 304.

Figure 4:
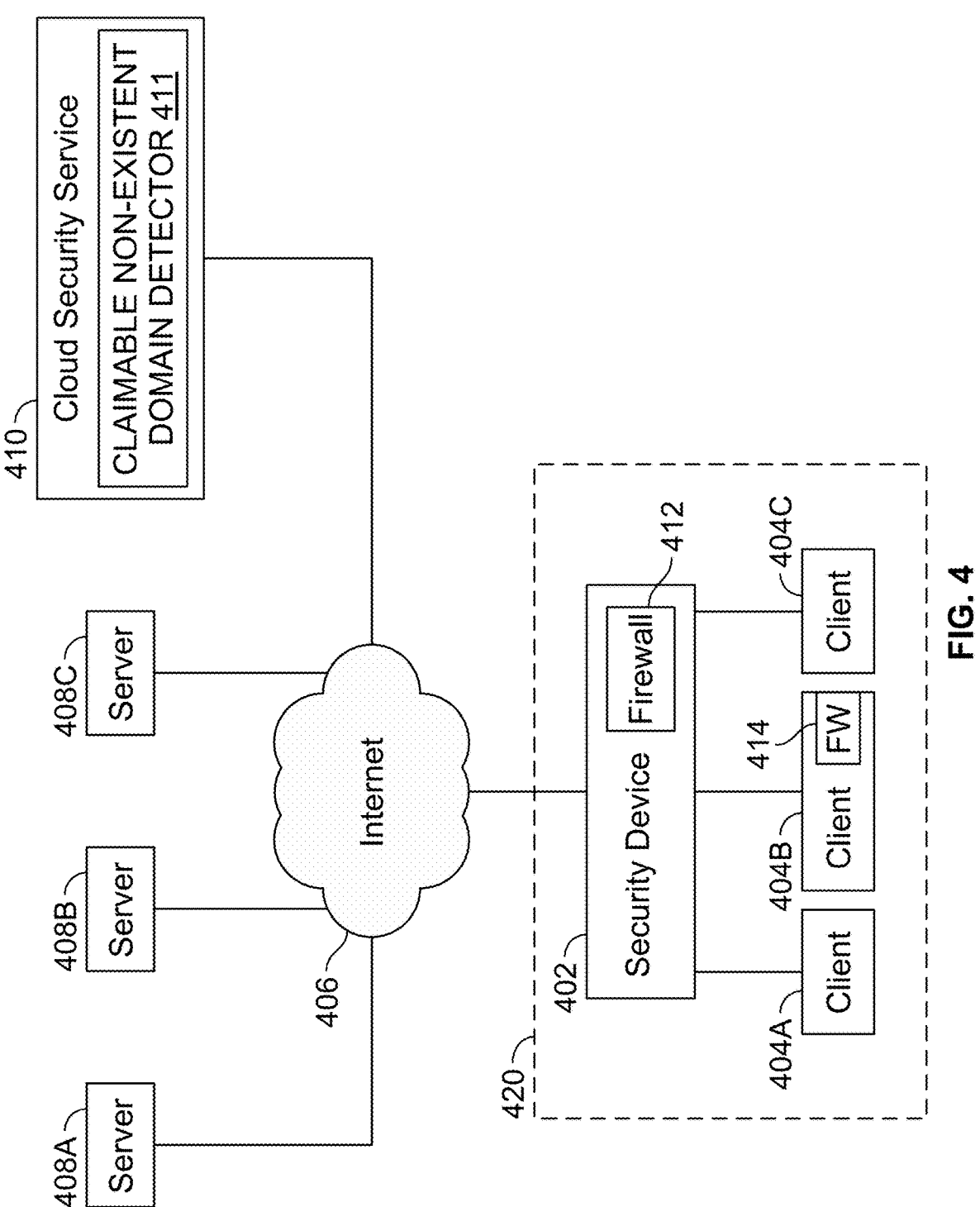
FIG. 4 is a block diagram illustrating another network architecture for detecting and protecting claimable non-existent domains in accordance with some embodiments.

FIG. 4 is a block diagram illustrating another network architecture for detecting and protecting claimable non-existent domains in accordance with some embodiments. As shown in FIG. 4, client devices 404A, 404B, and 404C are in communication with the Internet 406 via a security device 402. In some embodiments, the security device 402 includes a firewall 412 as shown, which can be used for security for enterprise network 420. In some embodiments, one or more of the client devices 404A-404C include a firewall 414 (e.g., host-based firewall) as shown. In some embodiments, the security device 402 includes a data appliance (e.g., a security appliance), a gateway (e.g., a security server), a server (e.g., a server that executes security software including firewall 412), and/or some other security device, which, for example, can be implemented using computing hardware, software, or various combinations thereof. In some embodiments, firewall 412 and/or firewall 414 perform some or all of the functions described above with respect to FIG. 1. For example, client devices 404A-C can include various computing devices that can access the Internet via wired and/or wireless communications, such as computer, laptops, tablets, smart phones, and/or various other types of computing devices with network communication capabilities. As also shown, servers 408A-C are in communication with the Internet 406. For example, a client device can access a service provided by a server via the Internet, such as a web-related service (e.g., web site, cloud-based services, streaming services, or email service), peer-to-peer related service (e.g., file sharing), IRC service (e.g., chat service), and/or any other service that can be delivered via the Internet.

As will now be apparent, some or all of the functions described above with respect to FIG. 1 can be assisted by or implemented in whole or in part by the security cloud service 410. The security cloud service 410 can, for example, reduce the processing on the security device 402. As another example, detection of security policy violations and/or vulnerabilities based on password constraint enforcement used in external site authentication can be reported to the security cloud service 410 by the security device 402. In some embodiments, the security cloud service 410 includes a claimable non-existent domain detector 411 for detecting and protecting claimable non-existent domains. In some embodiments, the claimable non-existent domain detector 411 is located in the firewall 412 (not shown).

Figure 5:
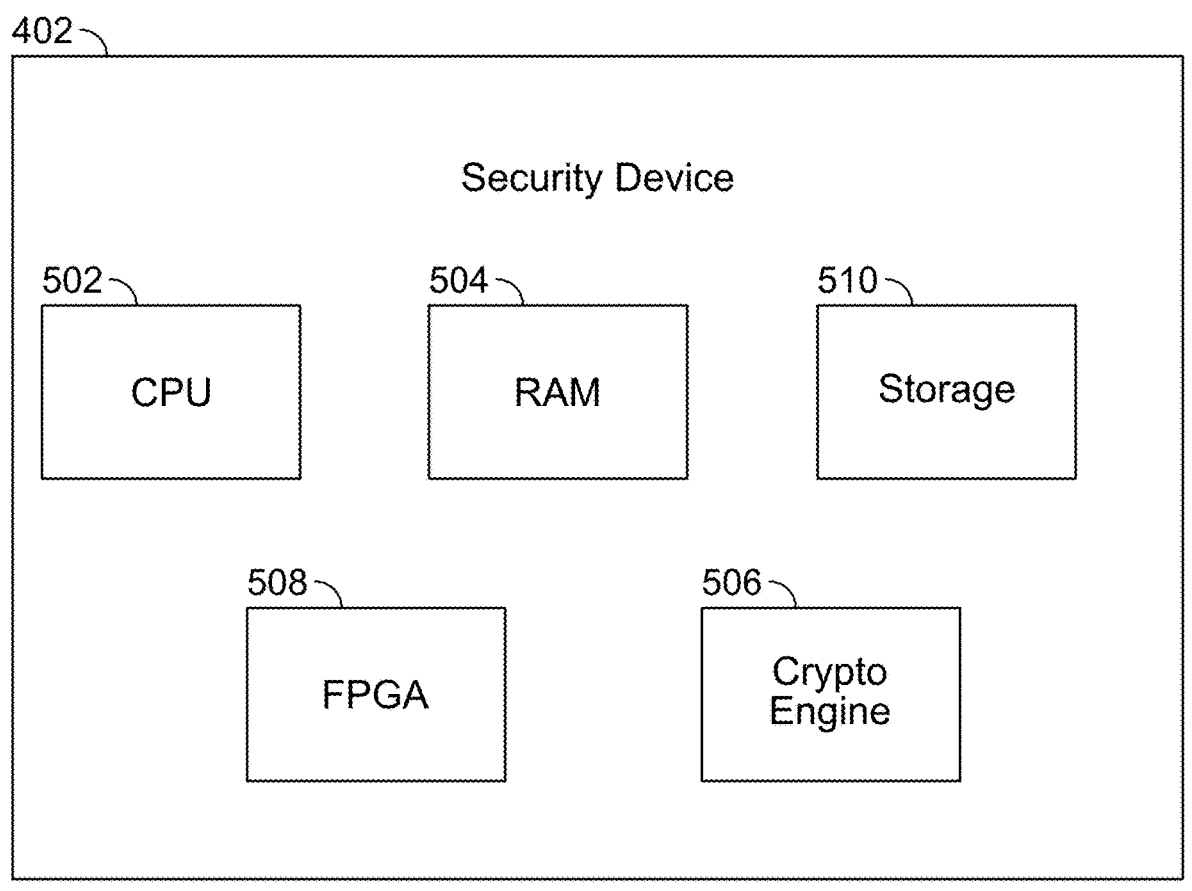
FIG. 5 is a functional diagram of hardware components of a security device for detecting and protecting claimable non-existent domains in accordance with some embodiments.

FIG. 5 is a functional diagram of hardware components of a security device for detecting and protecting claimable non-existent domains in accordance with some embodiments. The example shown is a representation of physical components that can be included in security device 402 (e.g., an appliance, gateway, or server). Specifically, security device 402 includes a high performance multi-core CPU 502 and RAM 504. Security device 402 also includes a storage 510 (e.g., one or more hard disks or solid state storage units), which is used to store policy and other configuration information as well as signatures. Security device 402 can also include one or more optional hardware accelerators. For example, security device 402 can include a cryptographic engine 506 configured to perform encryption and decryption operations, and one or more FPGAs 508 configured to perform signature matching, act as network processors, and/or perform other tasks.

Figure 6:
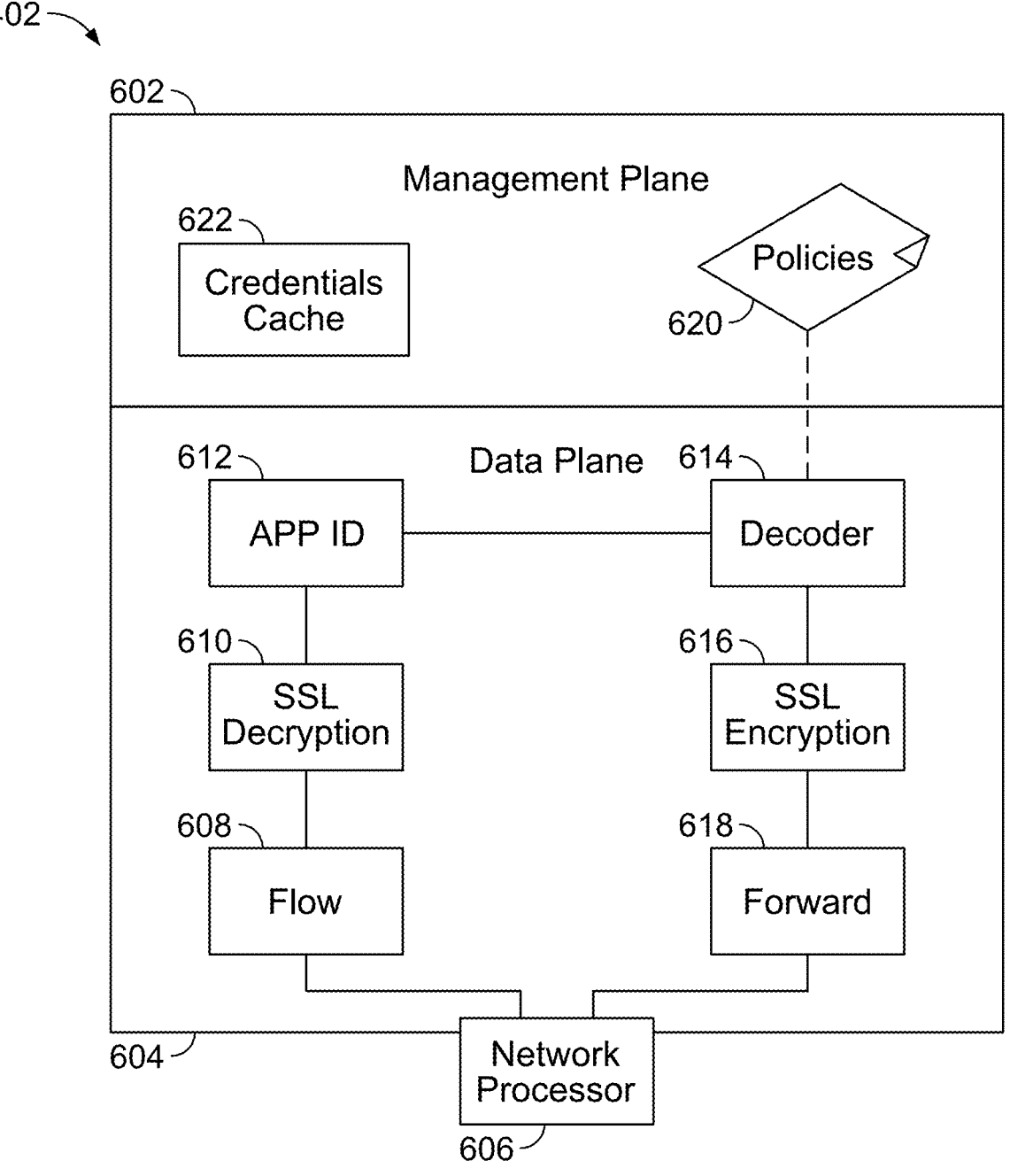
FIG. 6 is a functional diagram of logical components of a security device for detecting and protecting claimable non-existent domains in accordance with some embodiments.

FIG. 6 is a functional diagram of logical components of a security device for detecting and protecting claimable non-existent domains in accordance with some embodiments. The example shown is a representation of logical components that can be included in security device 402. As shown, security device 402 includes a management plane 602 and a data plane 604. In some embodiments, the management plane is responsible for managing user interactions, such as by providing a user interface for configuring policies and viewing log data. The data plane is responsible for managing data, such as by performing packet processing and session handling.

Suppose a client 404A attempts to access a server 408B using an encrypted session protocol, such as SSL. Network processor 606 is configured to receive packets from client 404A, and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decryption engine 610 using various techniques as described herein. Otherwise, processing by SSL decryption engine 610 is omitted. Application identification module 612 is configured to determine what type of traffic the session involves and to identify a user associated with the traffic flow. For example, application identification module 612 can recognize a GET request in the received data and conclude that the session requires an HTTP decoder. For each type of protocol, there exists a corresponding decoder 614. In some embodiments, the application identification is performed by an application identification module (e.g., APP-ID engine), and a user identification is performed by another function/engine. Based on the determination made by application identification module 612, the packets are sent to an appropriate decoder 614. Decoder 614 is configured to assemble packets (e.g., which may be received out of order) into the correct order, perform tokenization, and extract out information (e.g., to identify username/password credentials being submitted to an external site for user authentication). Decoder 614 also performs signature matching to determine what should happen to the packet. SSL encryption engine 616 performs SSL encryption using various techniques as described herein. Forwarding module 618 forwards the encrypted packet to its destination. As also shown, policies 620 are received and stored in the management plane 602. In some embodiments, policy enforcement using signatures is applied as described herein with respect to various embodiments based on the monitored, decrypted, identified, and decoded session traffic flows. In some embodiments, a credentials cache 622 is also provided for maintaining user credentials (e.g., a cache that can include usernames and passwords, such as a hash of the password data, can be stored, such as using an MD5 hash or another hash algorithm) associated with each external site for each user.

As an example, a non-existent domain (NXDOMAIN) test.local, which is a local domain, is not going to be resolved in the event that a query including test.local is sent to an external or a public DNS name space. As an aspect, an issue can exist when the NXDOMAIN test.local is claimable. A claimable domain can mean that the domain can be registered in a public DNS name space. In another example, test.com is a claimable domain in the event that the domain test.com is not registered by a third party, and subsequently, anyone can register the domain test.com.

One of the benefits of the present application includes that when customers are visiting claimable NXDOMAINS or rentable non-existent subdomains of domain hosting services, the visiting claimable NXDOMAINS or the rentable non-existent subdomains can be considered a vulnerability for the customer. An example of a rentable non-existent subdomain includes ruian.github.io by a domain hosting service (i.e. github.io). Because any party (e.g., a researcher, an attacker, or any other party) can register the claimable NXDOMAIN, any party can hijack the traffic for that domain. Detecting various kinds of claimable NXDO-MAINS can provide protection such as, for example, block-ing queries for this claimable NXDOMAIN. In other words, an attacker can just register the claimable domain, and then hijack the traffic destined for the registered domain.

One of the possible causes of NXDOMAIN queries includes a virus issuing NXDOMAIN queries. From a DNS client source where an NXDOMAIN query originates from, a cause of the NXDOMAIN inquiries include candidate command and control (C2) domains or a misconfiguration of the DNS query. For example, a DNS client sends a DNS query asking for an IP address of example.com. On the other hand, the DNS name servers include many name servers capable of responding to a query requesting the IP address of the domain example.com.

In another example, using attack.com as the example, attackers can also have their own DNS name servers. As an aspect, for a DNS client, NXDOMAIN queries can be generated by, for example, leaked queries from internal network services. A leaked query can be an internal query that gets sent to the public name space. An example of a leaked query can originate from a client using an autodis-cover service (e.g., autodiscover.com) to access an internal network service. Some common applications such as, for example, Microsoft Outlook or an email configuration ser-vice can use a DNS-based autodiscover service to try to automatically configure an email client or an email service. The autodiscover process typically involves automatically probing several domains. For example, autodiscover.com is an NXDOMAIN that will be automatically probed by the client, and usually autodiscover.com is an NXDOMAIN, so the domain is considered to be a vulnerability. As an aspect, some researchers have registered this domain, and then hijacked the traffic for the registered domain.

In another example, a similar issue can arise for domains used by internal employees. For example, an internal domain called panw.com is created for internal users/em-ployees of Palo Alto Networks, and the internal domain exists if the domain is only resolved internally. However, in the event that users outside of Palo Alto Networks try to access panw.com and enter the domain in their browser, the domain name will be resolved via the public DNS name space. This domain panw.com is actually under a global top-level domain (TLD), meaning anybody can register the domain panw.com under this TLD. As a result, an attacker can hijack the domain by registering it, and then try to compromise the employees from Palo Alto Networks. As an example, the employees can be subjected to phishing attacks, drive-by-download attacks, etc.

Attackers can exploit vulnerabilities by registering root domains or claiming rentable subdomains. Examples of this exploitation include traffic hijacking, man in the middle (MitM) attack, phishing, account takeover, domain takeover, setup command and control (C2), etc.

In some embodiments, a hijacker similarly leverages typo domains from a DNS client (e.g., paanw.com instead of panw.com), expired domains (e.g., figlief.com), an unin-tended uniform resource locator (URL) in social media (e.g., person.so), candidate command and control (C2) domains (e.g., v6pnsc8011.com), dangling domains (e.g., cloudlfare- .com), typo domains from a DNS server (e.g., ns3dnsmadeeasy.com instead of ns3.dnsmadeeasy.com), etc.

An example of an unintended URL social media includes a tweet including an automatically generated hyperlink. As example, the tweet can include a hyperlink for google.com. As an aspect, if the tweet has an error or there is a lack of accuracy in recognizing a URL string, then person.so is generated. In another example, an influencer tweets a mes-sage including person.so, which can generate a large amount of traffic for person.so. Since .so is a global top-level domain (GTLD), person.so can be registered by any third party, and the third party registering the domain can take over the traffic. In another example, for a candidate C2 domain, in the event that the malware is downloaded, the malware can have, for example, multiple NXDOMAINS. The originator of the candidate C2 domain does not necessarily register all the NXDOMAINS. As an example, assume that the attacker has registered the domain attackerone.com for receiving traffic from victims. As an aspect, in the event that the domain attackerone.com is blocked, the attacker will try to redirect the traffic to go to the domain attackthree.com from the victims. The clients, on the other hand, simply check which 10 domains or 100 domains to see if any one of the domain is available or not registered. If a domain is available or not registered, then the client will register the domain and start communicating with the registered domain.

Using a hypothetical company domain hypothetical.com as an example, when the company registers the domain to use their own hosting infrastructure, the company also registers many subdomains under their domain hypotheti-cal.com, so the company can dynamically change subdo-mains by hosting their own DNS name server under their DNS zone, which is basically a hypothetical.com zone. When configuring DNS records for subdomains, one or more typographical errors (typos) can be introduced, for example, test.hypothetical.com points to a typo domain cloudflaar.com instead of the correct domain cloudflare.com. Subsequently, an attacker can register the typo domain cloudflaar.com and take over all the traffic that goes to the subdomain test.hypothetical.com and redirect the traffic to the typo domain cloudflaar.com. In another example, a dangling domain is a vulnerability. Another name for a dangling domain can be an expired domain. As an example, when a domain is registered, for example, one year ago, and now, after one year, the domain's registration has expired. As an aspect, the domain can be still configured in the DNS zone. Subsequently, an attacker can leverage the dangling domain or the expired domain to launch an attack.

For the discussed examples, attackers can exploit vulner-abilities by registering root domains. Although the attackers can register these root domains, the root domains are called claimable NXDOMAINS, instead of registerable NXDO-MAINS because the claimable NXDOMAINS can also include claimable subdomains, for example, non-existent subdomains of root domains github.io or blogspot.com. Any claimable subdomain like ruian.github.io or ruian.blogspot-.com can be claimed by any third party. These claimable subdomains can be claimed by checking a third-party ser-vice through their application programming interface (API) to see whether a specific subdomain is available. If the specific subdomain is available, anyone can claim the spe-cific subdomain.

An attacker can register a claimable NXDOMAIN visited by a customer because the previous user of that domain may be deleting that record. For example, assume ruian.github.io has been registered by a user. As an aspect, in the event that the user later wishes to relinquish ownership of ruian.github.io, the user can just delete the domain record. As an aspect, anyone that has ruian.github.io configured in their DNS zone, then traffic will still continue to go the domain ruian.github.io.

As an aspect, in the event that the subdomain ruian.githu-b.io is a rentable NXDOMAIN, an attacker can hijack traffic to the subdomain. As an aspect, in the event that an attacker goes to github.io, checks whether ruian.github.io is available, finds the domain ruian.github.io available, and rents the subdomain ruian.github.io, an attacker can hijack the traffic that goes to the subdomain ruian.github.io. This scenario illustrates that the vulnerability is not limited to just the root domain. In other words, a vulnerability exists for a claimable non-existent subdomain.

As an example, traffic hijacking includes network traffic sent by a victim. In another example, an attack could include a man in the middle (MitM) attack using an internal network service such as Microsoft Outlook or an email configuration service. In this example, an attacker acts as an email client, and then decrypts the traffic from the victim. Subsequently, the attacker can set up an auto configuration service on that domain, interact with the client, and view the traffic on the network.

In another example, traffic hijacking includes phishing and uses an internal corporate domain name such as panw-.com. Accessing panw.com as the internal domain from within the corporate name is safe. As an aspect, in the event that an employee inadvertently attempts to access the internal domain panw.com from outside the corporate network (e.g. an external network), the internal domain name can be exposed to the public name space. Subsequently, the internal domain name can be taken over to launch phishing attacks by mimicking real content of the internal domain name.

In yet another example, an attacker can take advantage of an expired domain using the following process: in the event that a software package is registered, typically, an email is used to register the software package. For example, an email address used to register the software package is ruian@example.com. After the software package is published, the domain of the email address is example.com. In the event that the email domain has expired, an attacker can register the email domain, set up a mail service again using the email domain, and subsequently receive a password reset email for the published software, which can lead to a takeover of the account associated with the software package.

An account takeover can involve any service that uses an email account for a password reset. In the event that the email account gets compromised by a third party, the service can be taken over by the third party via a password reset.

In another example, a domain takeover refers to a scenario where a registrant owner's email domain has expired. In the event that the registrant owner's email domain has expired, an attacker can take over the email domain and send a domain transfer request using the registrant owner's email account. The registrant, which is now the attacker, can actually answer those emails via the email account to take over a corresponding live domain.

The domain takeover is similar to the account takeover. As an aspect, the domain takeover occurs in the domain space instead of an account. Also, the domain takeover can also set up a C2.

Figure 7:
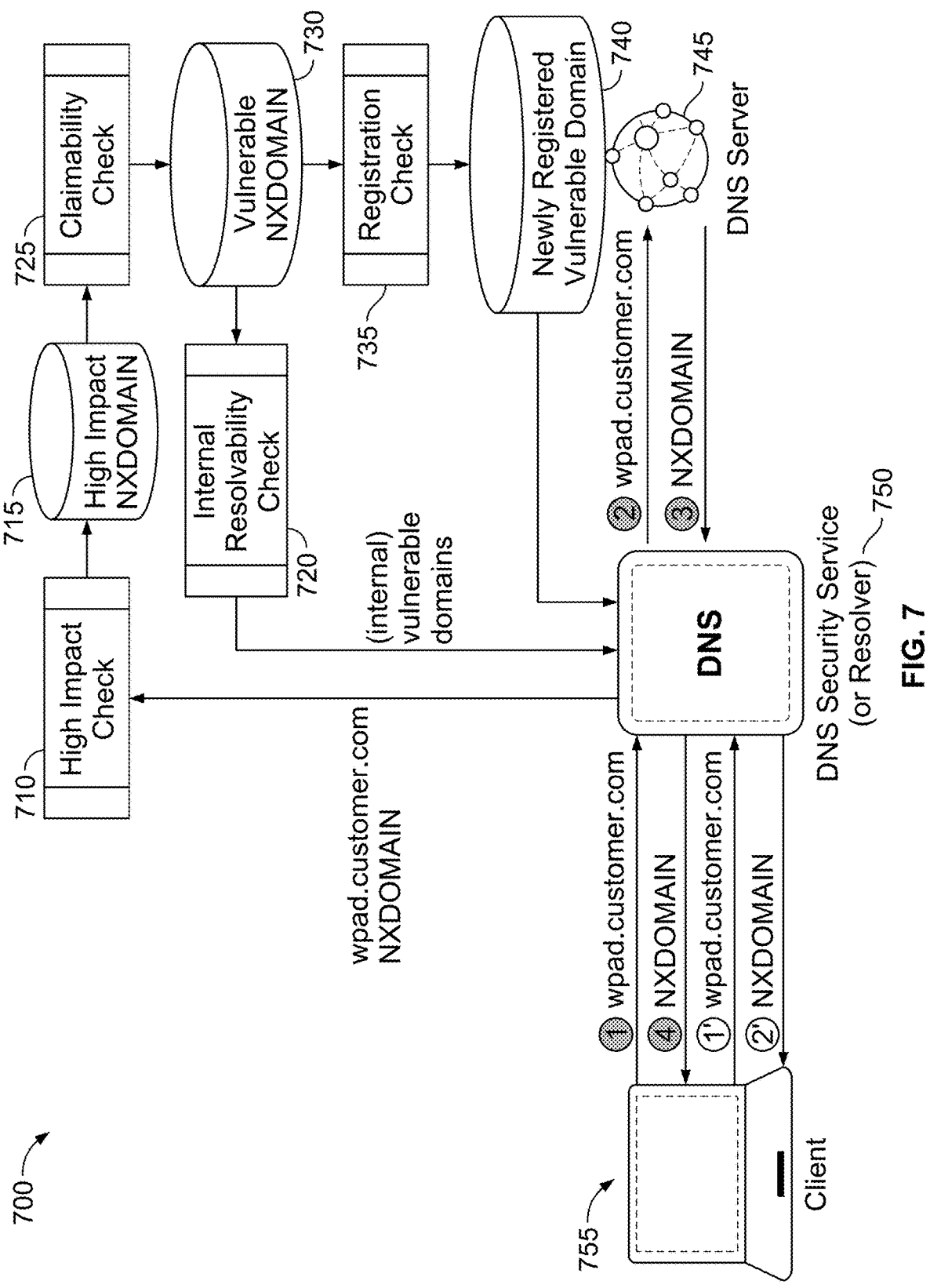
FIG. 7 is a system diagram illustrating a workflow for detecting a claimable non-existent domain in accordance with some embodiments.

FIG. 7 is a system diagram illustrating a workflow for detecting a claimable non-existent domain in accordance with some embodiments. In some embodiments, workflow 700 is implemented by a server 216, 218, and/or 220 of FIG. 2, a cloud security service 410 of FIG. 4, and/or a security device 402 of FIG. 4 and comprises: a high impact check module 710, a high impact non-existent domain (NXDO-MAIN) store 715, an internal resolvability check module 720, a claimability check module 725, a vulnerable NXDO-MAIN store 730, a registration check module 735, and a newly registered vulnerable domain store 740.

In some embodiments, workflow 700 further includes a Domain Name System (DNS) Server 745, a Domain Name System (DNS) Security Service (or Resolver) 750, and a client 755.

Typically, cybersecurity solutions attempt to identify the root cause of an NXDOMAIN query because they do not have a firewall level view. On the other hand, in workflow 700, claimable NXDOMAIN DNS queries sent by customers are identified, and an action is performed on the claimable NXDOMAIN DNS queries that are determined to be vulnerable. In some embodiments, the action includes blocking a response to the claimable NXDOMAIN, alerting an administrator, quarantining a source device querying the claimable NXDOMAIN, logging a source device querying the claimable NXDOMAIN, registering the NXDOMAIN, etc. Because workflow 700 addresses the issue from the firewall perspective, identifying the root cause of the NXDOMAIN query is not required to protect a customer.

The NXDOMAIN can be defined as a domain that when queried the DNS response code being returned indicates the domain being queried does not exist. NXDOMAIN queries can pose security risks when they are claimable and can be potentially controlled by attackers or malicious third parties.

Examples of sources that can generate NXDOMAIN queries include:

From a DNS Client: leaked queries by internal network services (e.g., autodiscover.com), leaked queries for internal domains (e.g., panw.name), typo domain (e.g., paanw.com), expired domain (e.g., figlief.com), unintended URL in social media (e.g., person.so), candidate domain generation algorithm (DGA) command and control (C2) domain (e.g., v6pnsc8011.com), etc. Typically, client-side source domains are caused by errors (e.g. typos/misconfigurations/attacks) on DNS clients (e.g., laptops/printers/phones), and the detection of client-side source domains does not involve checking DNS records for a target domain.

From a DNS Server: dangling domain (e.g., cloudlfare-.net), typo domain (e.g., ns3dnsmadeeasy.com), etc. Typically, server-side source domains are caused by errors (e.g., typos/misconfigurations) on the DNS name servers, and the detection of server-side source domains can involve checking DNS records for a target domain.

Identifying how an NXDOMAIN is generated is not a concern in detecting claimable NXDOMAINS. Instead, identifying whether a domain is an NXDOMAIN and determining whether the identified NXDOMAIN is claimable by a third party, including attackers, are described. In the event that these two conditions are true, workflow 700 attempts to block queries relating to the detected claimable NXDO-MAIN.

In workflow 700, four components can be used to detect a claimable NXDOMAIN. The four components include: the high impact check module 710, the internal resolvability check module 720, the claimability check module 725, and the registration check module 735.

In some embodiments, the high impact check module 710 is configured to identify candidate claimable NXDOMAINS or high impact NXDOMAIN to further analyze. In some embodiments, the high impact NXDOMAINS are stored in the high impact NXDOMAIN store 715. Although a domain is an NXDOMAIN, further analysis is to be performed to determine whether the NXDOMAIN is claimable.

In some embodiments, the claimability check module 725 is configured to determine whether the candidate claimable NXDOMAIN is claimable by querying a registrar by using a registrar API such as, for example, GoDaddy, to check whether the candidate claimable NXDOMAIN is claimable by a third party. In the event that the candidate claimable NXDOMAIN is determined to be claimable, the claimability check module 725 determines that the candidate claimable NXDOMAIN is a vulnerable NXDOMAIN.

In some embodiments, the internal resolvability check module 720 is configured to check whether the vulnerable NXDOMAIN is internally resolvable. In the event that the vulnerable NXDOMAIN is determined not to be an internally resolved domain, the internal resolvability check module 720 can configure internal firewalls to simply block queries for the vulnerable NXDOMAIN. As an aspect, in the event that the vulnerable NXDOMAIN is an internally resolved domain, the internal resolvability check module 720 can configure internal firewalls to allow all queries for the internally resolved domain, in this scenario, and external queries for the vulnerable NXDOMAIN can be blocked because blocking all queries for the internally resolved vulnerable NXDOMAIN can limit access to internal services using, for example, panw.com.

Queries for the vulnerable NXDOMAINS that target public domains or external sites are to be blocked, so responses originating from public resolvers and that do not point to internal services are to be blocked because the vulnerable NXDOMAIN is actually supposed to be internally resolved only rather than appear in the public name space. For these vulnerable NXDOMAINS that are leaked into the public name space and can be publicly claimed, the vulnerable NXDOMAIN queries can pose security risks because the vulnerable NXDOMAINS can be potentially controlled by attackers or malicious third parties.

Lastly, in some embodiments, the registration check module 735 is configured to perform a registration check on vulnerable NXDOMAINS because after at least one of the three check modules is executed, a domain can be determined to be claimable and vulnerable. Subsequently, all the queries for the claimable NXDOMAIN can be blocked or queries to a public resolver targeting a claimable NXDOMAIN based on the internal resolvability of the claimable NXDOMAIN can be blocked. As an aspect, these claimable and vulnerable domains can be actively registered by attackers, by researchers, by defenders, or any combination thereof. Because these domains were determined to be previously vulnerable, they are assigned to a category called a newly registered vulnerable domain (NRVD).

In DNS security, there is also a category called newly registered domain (NRD). The difference between the newly registered domain and the newly registered vulnerable domain is that there is more evidence that the newly registered vulnerable domain can be potentially attacked because there is evidence that the domain was vulnerable. In this scenario, customers can block access to the newly registered domain for a extended period of time in relation to the newly registered vulnerable domain.

As an example, for a newly registered domain, a suggested policy for customers can be to block the newly registered domain for 30 days, and for the newly registered vulnerable domain, a suggested policy for customers can, for example, be to block the newly registered vulnerable domain for 45 days or 90 days, which is longer than for the newly registered domain.

As an example, in operation 1, the client 755 queries wpad.customer.com, and in operation 4, the client 755 receives an NXDOMAIN from the DNS security service (or resolver) 750. In operation 2, since the protection does not exist, the DNS security service or resolver 750 will relay the query, wpad.customer.com, to the DNS server 745, which is a top-level domain server and the root name server. In operation 3, the DNS server 745 returns an NXDOMAIN response back to the DNS security service (or resolver) 750 and in operation 4, the DNS security service (or resolver) 750 returns the NXDOMAIN response back to the client 755.

As an aspect, in the event that a domain is identified as a claimable NXDOMAIN, operations 2 and 3 can be omitted so that the DNS security service (or resolver) 750 does not need to relay the query, wpad.customer.com, to the DNS server 745, and the DNS server 745 does not return the NXDOMAIN response. As a result, the DNS query, wpad-.customer.com, will not be leaked to the public name space, which can be, for example, observed by passive attackers or by a name server, like, for example, owners or maintainers. The owners, maintainers, and/or attackers are prevented from obtaining the claimable NXDOMAIN, registering the claimable NXDOMAIN, and then taking over the traffic destined for the claimable NXDOMAIN.

By blocking operations 2 and 3 where the DNS security service (or resolver) 750 does not need to relay the query, wpad.customer.com, to the DNS server 745, and the DNS server 745 does not return the NXDOMAIN response, visibility of the claimable NXDOMAIN by a third party can be blocked. Furthermore, even if the claimable NXDO-MAIN gets registered by attackers, we can place the domain in the NRVD category, which will allow us to protect the customer where the DNS security service (or resolver) 750 receives the query for wpad.customer.com (operation 1') and returns the NXDOMAIN response for an extended period of time in comparison to a domain categorized in the NRD category (operation 2').

Figure 8:
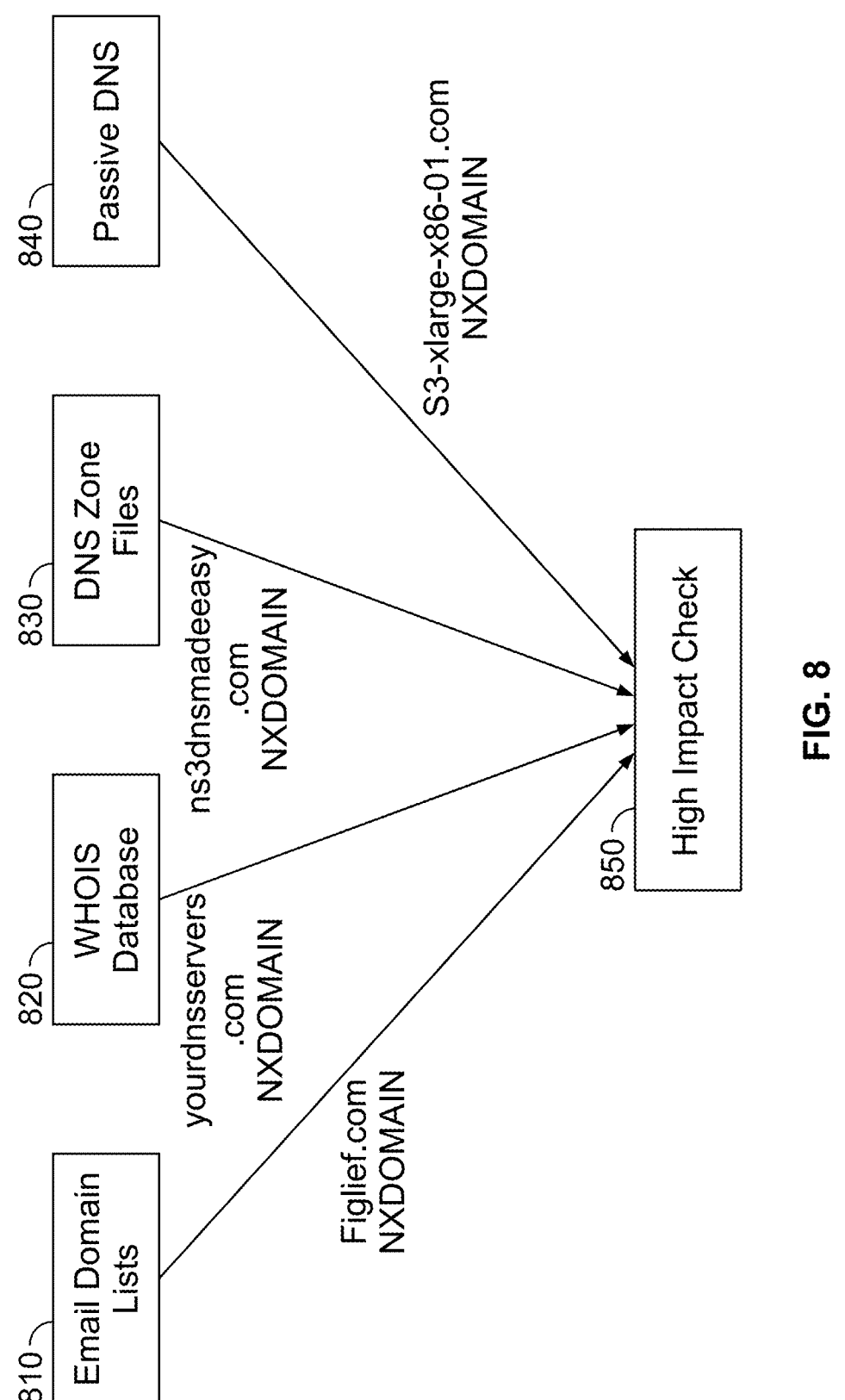
FIG. 8 is a system diagram illustrating a high impact check module in accordance with some embodiments.

FIG. 8 is a system diagram illustrating a high impact check module in accordance with some embodiments. In some embodiments, the high impact check module 850 is an implementation of the high impact check module 710 of FIG. 7.

In some embodiments, the high impact check module 850 uses a first data source including a telemetry log (not shown) from a DNS security service to identify claimable NXDO-MAINs. In some embodiments, the telemetry log includes every DNS query sent to the DNS security service, and a corresponding DNS response. In some embodiments, the telemetry log comes from local firewalls.

In some embodiments, the high impact check module 850 uses a second data source including a passive DNS (pDNS) data source 840. The pDNS data source 840 can refer to, for example, data leads ingested from a third party, including Farsight. In other words, any pDNS data source 840 can correspond with the second source. In some embodiments, an NXDOMAIN response code can be used to identify which domains are vulnerable from the passive DNS data source 840. As example, S3-xlarge-x86-01.com corresponds with a domain generated by a cloud service, and yourdns-servers.com relates to an expired domain.

In some embodiments, the high impact check module 850 uses a third data source including DNS zone files 830. Please note that although DNS zone files 830 are similar to the pDNS data source 840, the DNS zone files 830 have the limitation that only top-level domains can be identified from the DNS zone files 830, for example, .com, .org, .edu, and .us are available top-level domains, and not all top-level domains are available to be identified from the DNS zone files 830. The name server (NS) records are included in the DNS zone files 830. For example, assume a user that wants to visit test.com, and that the user does not know the IP address of test.com, the user asks the name server via, for example, ns3dnsmadeeasy.com. The name server will redirect the user to ns3dnsmadeeasy.com, and then obtain the IP address of the test.com for subsequent visits. As an aspect, if the name server domain is an NXDOMAIN, the name server domain can be registered by attackers to hijack network traffic.

In some embodiments, the high impact check module 850 uses a fourth data source including the WHOIS database 820. The WHOIS database 820 includes domain registration information, which includes expiration dates of domains. For example, if a domain has expired for 45 days or more, the domain can be claimable or registered by a third party. The 45-day waiting period is a commonly implemented practice by domain registrars. The 45-day waiting period includes a 30-day period that is reserved exclusively for the original owner to renew the domain, and then is followed by a 15-day grace period. In other words, the WHOIS database 820 can be leveraged to identify domains that have recently expired and can be claimed by a third party.

In some embodiments, the high impact check module 850 uses a fifth data source including the email domain lists 810. For example, the email domain lists 810 can be found in publicly accessible data sources. NPM, PyPi, Crunchbase, etc. are examples of publicly accessible data sources that include email addresses. As an example, these data sources provide software packages that list the owners' email addresses. For example, an NPM software package and/or a PyPi software package includes the software package's owner's name and the software package's owner's email address or the software package's company's email address. In another example, Crunchbase provides a company owner's email address. For each of these email addresses, if any of the email domains of the email addresses have expired, an attacker can register a corresponding email domain and take over the corresponding email account, or even possibly take over the domain. In a real-world example, figlief.com is the email domain of a maintainer of a software package where an attacker took over the email domain.

From the five data sources, four rules can be applied to identify high impact NXDOMAINS or candidate claimable NXDOMAINS.

In a first rule, in the event that a domain is a claimable NXDOMAIN from a server-side source, the high impact check module 850 can determine the claimable NXDOMAIN to be a high impact NXDOMAIN or a candidate claimable NXDOMAIN. As an example, server-side sources relate to DNS servers who answer DNS queries.

In a second rule, in the event that a client-side source domain has more than N customers or more than M visits, the high impact check module 850 can determine the client-side source domain to be a high impact NXDOMAIN or a candidate claimable NXDOMAIN. By determining the number of customers visiting NXDOMAINS or the number of devices visiting NXDOMAINS, the high impact check module 850 can determine a claimable NXDOMAIN to be a high impact NXDOMAIN or a candidate claimable NXDOMAIN. As an example, client-side sources relate to DNS clients who send DNS queries.

In a third rule, in the event that a domain has recently expired, typically, either the customer forgot to renew the domain which will cause normal traffic to continue to go to the domain or an attacker obtained control of the domain and the domain was abandoned with victim traffic continuing to go to the domain. In either situation, the recently expired domains can still have visitors, which can be exploited and the high impact check module 850 can determine the recently expired domains to be a high impact NXDOMAIN or a candidate claimable NXDOMAIN. In these situations, the recently expired domains correspond with a client-side source because the situations do not involve checking a DNS record for target domains.

The high impact check module 850 can use different detection techniques when detecting a high impact NXDOMAIN for a server-side source or a client-side source.

In a fourth rule, in the event that an NXDOMAIN is from an email domain list, the high impact check module 850 can categorize the NXDOMAIN as a high impact NXDOMAIN or a candidate claimable NXDOMAIN.

Referring back to FIG. 7, the claimability check module 725 is configured to perform a claimability check on the candidate claimable NXDOMAINS, which includes querying all of the candidate claimable NXDOMAINS against a domain registry using an application programming interface (API) provided by a domain registry or domains that rent subdomains. Examples of domain registries include Google Domains, GoDaddy, Namecheap, etc. Examples of domains that rent subdomains include github.io and blogspot.com. By querying the domain registries or domains that rent subdomains using the APIs, the claimability check module 725 is configured to determine whether any one of the candidate claimable NXDOMAINS is claimable by a third party. In the event that any one of the candidate claimable NXDOMAINS is claimable, the claimability check module 725 can determine that the claimable candidate NXDOMAIN is a vulnerable NXDOMAIN to be stored in the vulnerable NXDOMAIN store 730.

For firewall protection purposes, the internal resolvability check module 720 is configured to check a vulnerable NXDOMAIN against a customer telemetry log to determine whether the vulnerable NXDOMAIN is internally resolvable. The vulnerable NXDOMAIN is internally resolvable in the event the customer telemetry log includes queries for the vulnerable NXDOMAIN. In the event the customer telemetry log includes queries for the vulnerable NXDOMAIN, the internal resolvability check module 720 determines that the vulnerable NXDOMAIN is an internally resolvable domain. In some embodiments, the internal resolvability check module 720 determines whether a returned IP address points to an internal IP address of the customer. In the event that the returned IP address points to an internal IP address of the customer, the internal resolvability check module 720 determines that the vulnerable NXDOMAIN is an internally resolved domain or an internally used domain. In the event that a returned IP address of the vulnerable NXDOMAIN does not point to an internal IP address of the customer, the internal resolvability check module 720 determines that the vulnerable NXDOMAIN is not an internally resolved domain or an internally used domain.

In the event that the vulnerable NXDOMAIN is determined to not be internally used, the internal resolvability check module 720 determines that all the queries for the vulnerable NXDOMAIN can be blocked. All the queries can include outgoing queries and internal queries within the network. On the other hand, in the event that the vulnerable NXDOMAIN is determined to be internally used or internally resolved, the internal resolvability check module 720 can determine that queries for the vulnerable NXDOMAIN going towards a public resolver or a public name space are to be blocked, and queries for the vulnerable NXDOMAIN going towards an internal resolver are not blocked because queries going towards the internal resolver can be, for example, used to access internal services.

In addition, the registration check module 735 is configured to perform a registrar check to monitor which vulnerable NXDOMAINS are being registered. In the event that a vulnerable NXDOMAIN becomes registered, the vulnerable NXDOMAINS can be moved to a new status as a newly registered vulnerable domain and stored in the newly registered vulnerable domain store 740. In some embodiments, newly registered vulnerable domains are blocked for an extended period of time in comparison to newly registered domains (NRDs).

In some embodiments, the registration check module 735 is executed before the internal resolvability check module 720.

As discussed earlier, Workflow 700 includes four modules including the high impact check module 710, the internal resolvability check module 720, the claimability check module 725, and the registration check module 735. The high impact check module 710 is configured to identify high impact NXDOMAINS or candidate claimable NXDOMAINS, from up to five types of data sources, to potentially block the five types of data sources including pDNS sources from a third party, internal customer telemetry log, DNS zone files for some top-level domains (TLDs), which include TLDs and do not include any second-level domains (SLDs), a WHOIS database, and email domain lists. The output of the high impact check module 710 includes candidate claimable NXDOMAINS that are subject to four criteria or rules. The candidate claimable NXDOMAINS come either from a server-side source or from a client-side source. In some embodiments, the candidate claimable NXDOMAINS come from a client-side source that has more than N customers or more than M visits to show their popularity or impact, or is on an email domain list.

As an example, N customers refers to a number N of internal customers for a DNS security service visiting a domain to be analyzed. The number of customers can be obtained from a log, such as a customer telemetry log. In another example, M visits for Google.com means that Google.com has been visited M times. The number of visits can be obtained from a log, such as a customer telemetry log or a passive DNS log.

In some embodiments, PyPi, Crunchbase, and NPM include email domain lists. For example, NPM stores software packages, such as, for example, JavaScript packages. These JavaScript packages include collaborators who can have their email addresses listed within NPM. In the event that an email domain of the email addresses has expired, the email domain can be registered, a new email service can be set up using the newly registered email domain, and a password reset email can be sent for the software package's NPM account. As a result, an attacker can take over the NPM account associated with the email address. Similar steps can be performed to take over software packages listed in PyPi and corporate resources listed in Crunchbase.

In some embodiments, the WHOIS database is used by attackers in at least two scenarios. In a first scenario, the WHOIS database includes expiration dates for domains, and the domains are checked using the WHOIS database to identify domains that have recently expired. Recently expired domains include candidate claimable NXDOMAINS that can potentially be registered by attackers. In a second scenario, the WHOIS database includes domain administrator email addresses. Some domains can include publicly available domain owner email addresses for the WHOIS information. In the event that an email domain of a domain owner has expired, an attacker can register the email domain, send a password reset to the publicly available main owner email address, and take over the domain. In this scenario, the WHOIS database can also fall under the email domain list category.

The claimability check module 725 is configured to perform a claimability check on a high impact NXDOMAIN to determine whether the high impact NXDOMAIN is a vulnerable NXDOMAIN.

Using domains github.io or blogspot.com as examples, an individual could have example.github.io or example.blogspot.com as secondary domains. The secondary domain would be claimable by a third party in the event that the secondary domain is deleted or abandoned by the original owner, so the claimability check module 725 can classify the secondary domain as a high impact NXDOMAIN or a candidate claimable NXDOMAIN.

The internal resolvability check module 720 is configured to determine whether the vulnerable NXDOMAIN is used internally. In the event that the vulnerable NXDOMAIN is not used internally, the internal resolvability check module 720 can instruct the DNS Security Service (or Resolver) 750 to block all queries including the vulnerable NXDOMAIN. In the event that the vulnerable NXDOMAIN is used internally, the internal resolvability check module 720 can instruct the DNS Security Service (or Resolver) 750 to block queries including the vulnerable NXDOMAIN when directed to a public resolver or a public name space and allow queries including the vulnerable NXDOMAIN when directed to an internal resolver to grant access to internal services.

The registration check module 735 is configured to determine whether the vulnerable NXDOMAIN is registered. In the event that a vulnerable NXDOMAIN is registered, the vulnerable NXDOMAIN is designated as a newly registered vulnerable domain.

In workflow 700, because domains are targeted during the pre-registration phase of a domain's lifecycle, the domains can be determined to not be found anywhere in the world by checking the public DNS name space, so the domains are protected early in their lifecycle against, for example, attackers, who can observe these queries.

This approach provides a broad coverage of claimable NXDOMAINS by checking five data sources, and detecting claimable domains from the client side, claimable domains from the server side, and recently expired domains.

As a benefit, protection for patient zero against attacks can be provided because protection can be provided at a pre-registration phase. As an aspect, protection from an attacker can be provided even before the launch of an attack. Also, customers are allowed to provide protection on both the client side and the server side. As an example, because a domain can be vulnerable on the client side, for example, a user's corporate laptop having an email client incorrectly configured, the email client could be leaking the domain. By detecting claimable NXDOMAINs, the firewall can be configured to block those visits. In addition, a list of claimable NXDOMAINS can be sent to the customer for troubleshooting to identify the root cause of the error causing the misconfigured claimable NXDOMAINS.

For the four types of detection criteria, the company can be protected via different manners. On the client side, a typo domain can be entered into a browser and sent to the Internet via a query and after the query including the typo domain has been sent, the firewall can block access to the typo domain associated with the query. In the event that the domain has been blocked, either the firewall returns a single NXDOMAIN response, or the firewall can display a verdict page. For example, the verdict page can illustrate that the typo domain is a vulnerable domain. On the server side, a detector can determine whether a domain, for example, server.com can be registered and if the domain server.com can be registered, the detector can identify the domain server.com as a vulnerable NXDOMAIN.

In some embodiments, the telemetry log data relates to passive DNS information from one or more customers. Telemetry log data can differ from pDNS information because pDNS information comes from a third party. In some embodiments, the telemetry log data is used in a similar manner as pDNS information. From the point of view of workflow 700, the telemetry log data and the pDNS information are treated the same.

One of the benefits of workflow 700 is that workflow 700 can potentially prevent attacks. As an example, workflow 700 can prevent patient zero vulnerabilities. A patient zero vulnerability is different from a zero-day vulnerability in that a zero-day vulnerability means that nobody knows about this vulnerability before the attack, and on the other hand, the patient zero vulnerability refers to a first victim being attacked.

As an example, malware is first downloaded and installed, and then the malware will attempt to delete your files or send your credentials to an attacker. The malware can trigger some logic in the system, and the system can detect the attack from the malware. In this example, the customer must first be compromised before the malware is detected. On the other hand, workflow 700 determines that a domain is vulnerable before the domain is registered, and the domain can be blocked for an extended period of time, which can include being registered to prevent the victim from being compromised.

As an aspect, a technical difference between the server-side source detection and the client-side source detection includes that there is a table joining operation, in the server-side source detection technique, joining the Resource Record (RR) data and the NXDOMAIN data.

As an example, the response table has Resource Record (RR) names, which relate to the query, pointing to RR data, which includes the pointed to domains, and the NXDOMAIN table has the same RR names including non-existing domain (NXDOMAIN) response codes. The two tables are joined on the condition that target domains in the response table equal the NXDOMAINS for queries. In other words, the two tables are intersected to identify domains in the response table that did not receive a response. In other words, the intersection of the two tables helps identify DNS records that point to NXDOMAINS.

The internal domain cannot be just simply blocked. For internal vulnerable domains, three types of protection can be provided: 1) queries to the internal vulnerable domains can be allowed and the customer can be notified about this leakage, 2) queries only towards internally resolved IP addresses can be allowed and all other destination IP addresses can be blocked, and 3) responses pointing to internal private IP addresses can be allowed and all other responses can be blocked.

Figure 9:
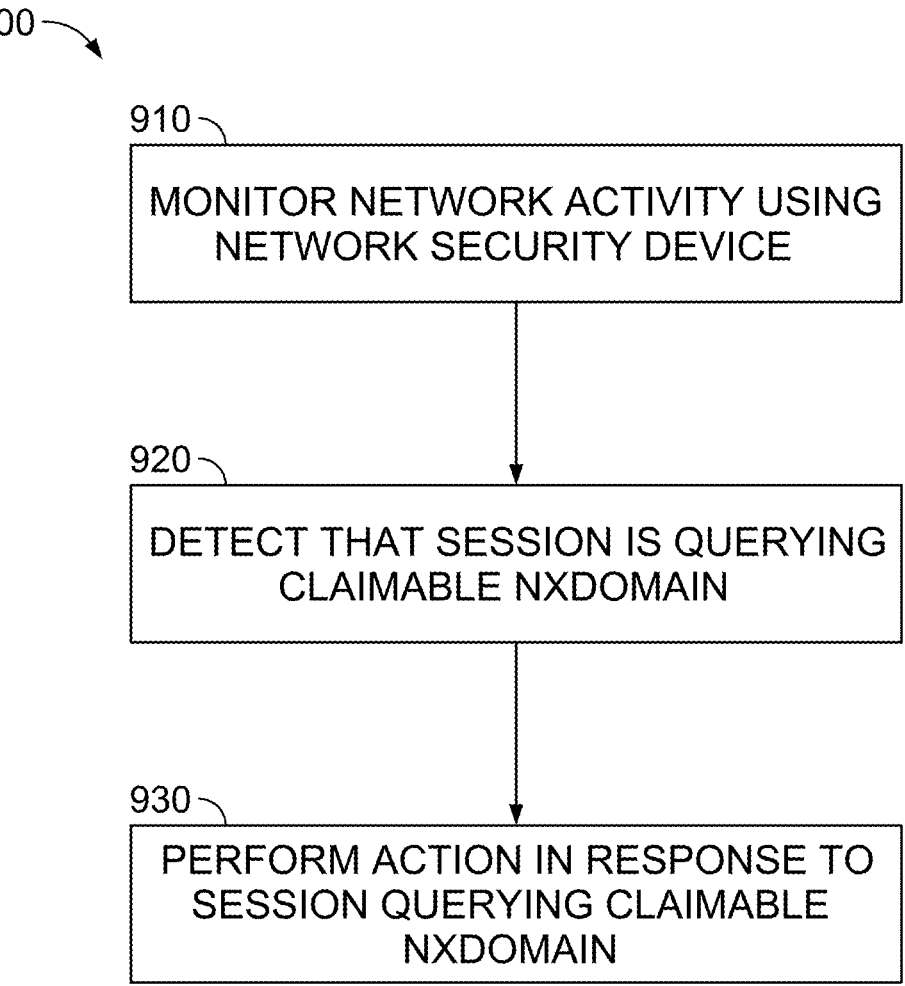
FIG. 9 is a flow diagram illustrating a process for detecting a claimable non-existent domain in accordance with some embodiments.

FIG. 9 is a flow diagram illustrating a process for detecting a claimable non-existent domain in accordance with some embodiments. In some embodiments, the process 900 is implemented by a data appliance, gateway, or firewall 202 of FIG. 2, firewall 412 or Security Device 402 of FIG. 4, or a cloud security service 410 of FIG. 4 and comprises:

In 910, the cloud security service monitors network activity using a network security device.

In 920, the cloud security service detects that a session is querying a claimable non-existent domain (NXDOMAIN) using a domain name system (DNS) security service.

In 930, the cloud security service performs an action in response to the session querying the claimable NXDO-MAIN.

Figure 10:
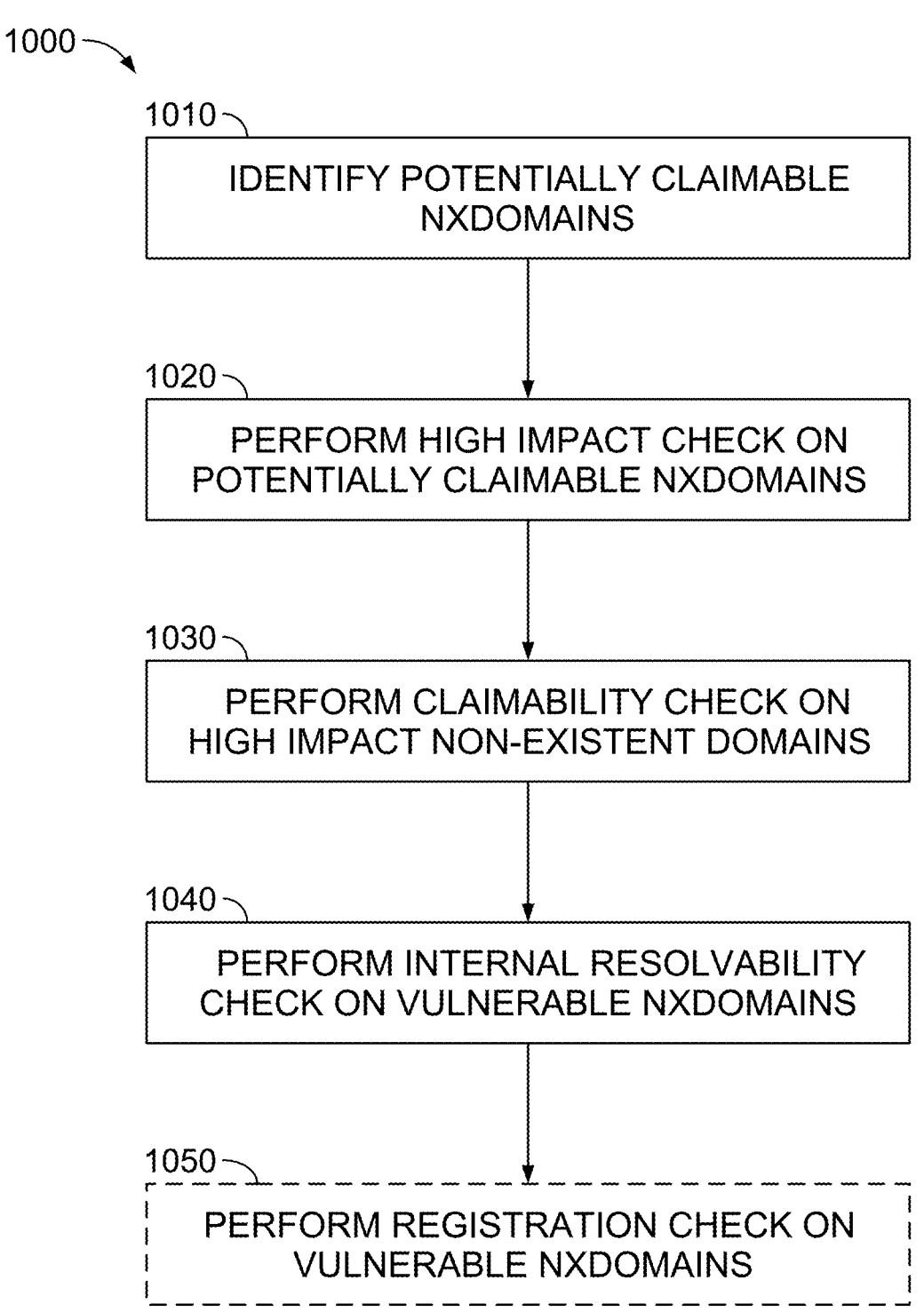
FIG. 10 is a flow diagram illustrating a process for detecting that a session is querying a claimable non-existent domain in accordance with some embodiments.

FIG. 10 is a flow diagram illustrating a process for detecting that a session is querying a claimable non-existent domain in accordance with some embodiments. In some embodiments, the process 1000 is an implementation of operation 920 and comprises:

In 1010, the cloud security service identifies potentially claimable NXDOMAINS.

In 1020, the cloud security service performs a high impact check on the potentially claimable NXDOMAINS to identify high impact non-existent domains.

In 1030, the cloud security service performs a claimability check on the high impact non-existent domains to identify vulnerable NXDOMAINS.

In 1040, the cloud security service performs an internal resolvability check on the vulnerable NXDOMAINS to identify internal vulnerable domains. In some embodiments, the cloud security service instructs a DNS security service to allow (or not block) the internal vulnerable domains to allow access to internal services.

In 1050, optionally, the cloud security service performs a registration check on the vulnerable NXDOMAINS to identify newly registered vulnerable domains.

In some embodiments, operation 1050 is performed before operation 1040.

Figure 11:
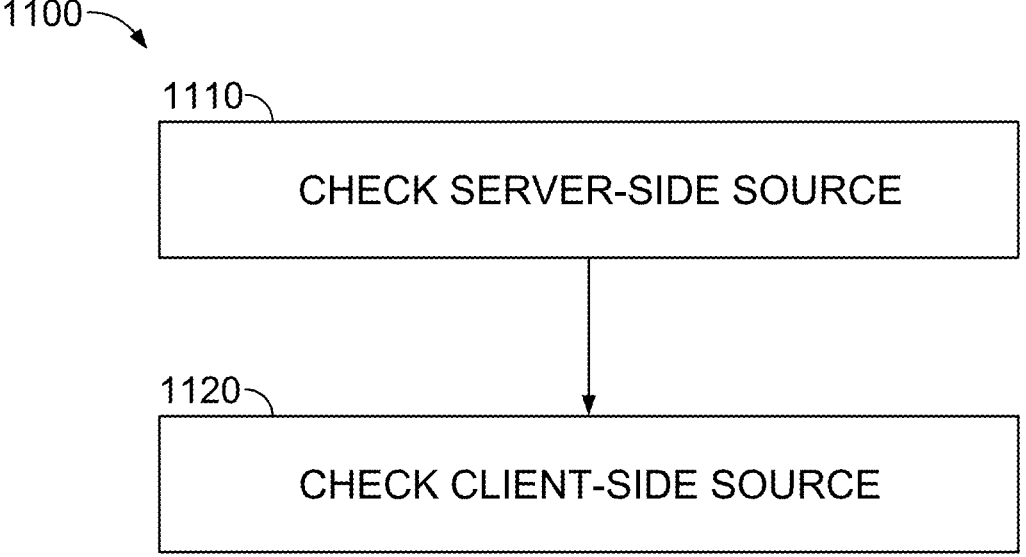
FIG. 11 is a flow diagram illustrating a process for performing a high impact check for a domain in accordance with some embodiments.

FIG. 11 is a flow diagram illustrating a process for performing a high impact check for a domain in accordance with some embodiments. In some embodiments, the process 1100 is an implementation of operation 1020 of FIG. 10 and comprises:

In 1110, the cloud security service checks a server-side source to identify a high impact NXDOMAIN. In some embodiments, the server-side source includes a telemetry log, a passive DNS log, a DNS zone file, or any combination thereof.

In 1120, the cloud security service checks a client-side source to identify a high impact NXDOMAIN. In some embodiments, the client-side source includes an email domain list, a Whois database for determining recently expired domains, a telemetry log for determining domains having more than N customers or M visits, and/or a passive DNS log for determining domains having more than N customers or M visits.

In some embodiments, the process 1100 only implements operation 1110 or operation 1120. In some embodiments, operation 1120 is performed before operation 1110.

Figure 12:
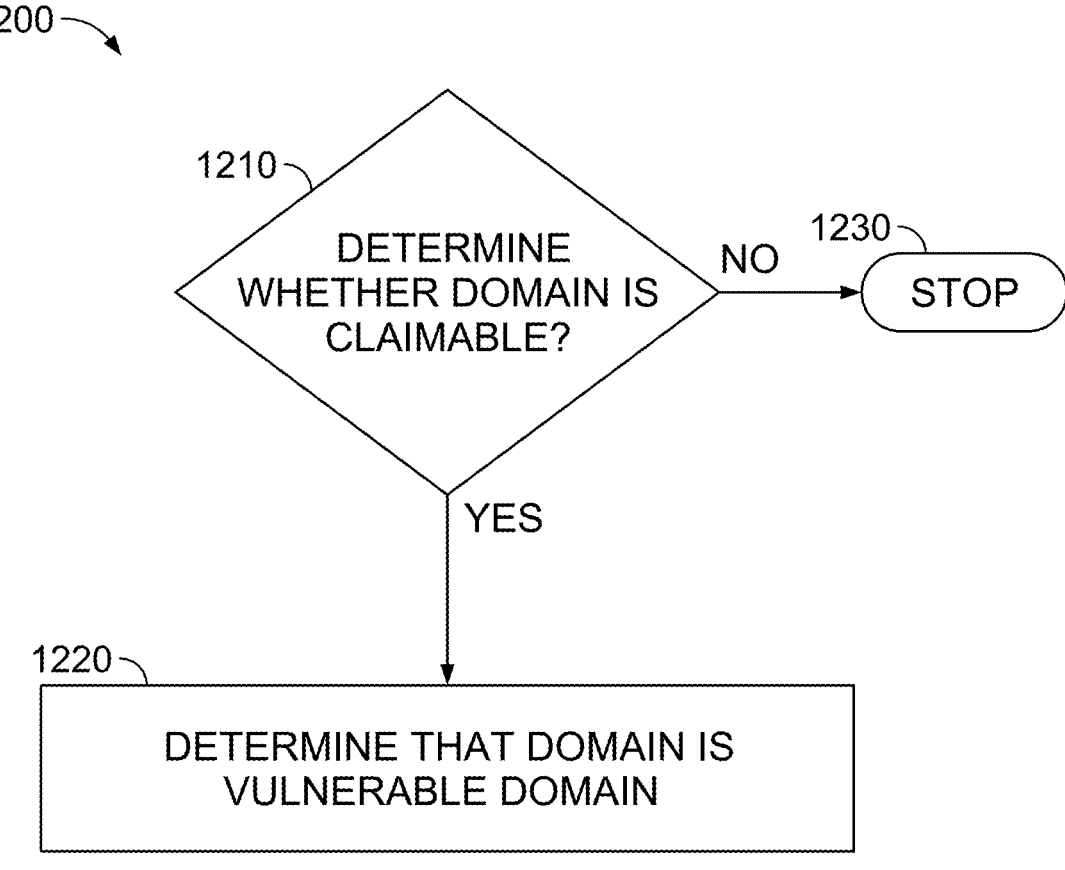
FIG. 12 is a flow diagram illustrating a process for performing a claimability check for a domain in accordance with some embodiments.

FIG. 12 is a flow diagram illustrating a process for performing a claimability check for a domain in accordance with some embodiments. In some embodiments, the process 1200 is an implementation of operation 1030 of FIG. 10 and comprises:

In 1210, the cloud security service determines whether a domain is claimable by querying a registrar API to check whether a domain is claimable by a third party and/or a service-specific API to check whether a rentable subdomain is claimable by a third party.

In 1220, in the event that the domain is claimable by a third party, the cloud security service determines that the domain is a vulnerable domain.

In 1230, in the event that the domain is not claimable by a third party, the cloud security service stops the process.

Figure 13:
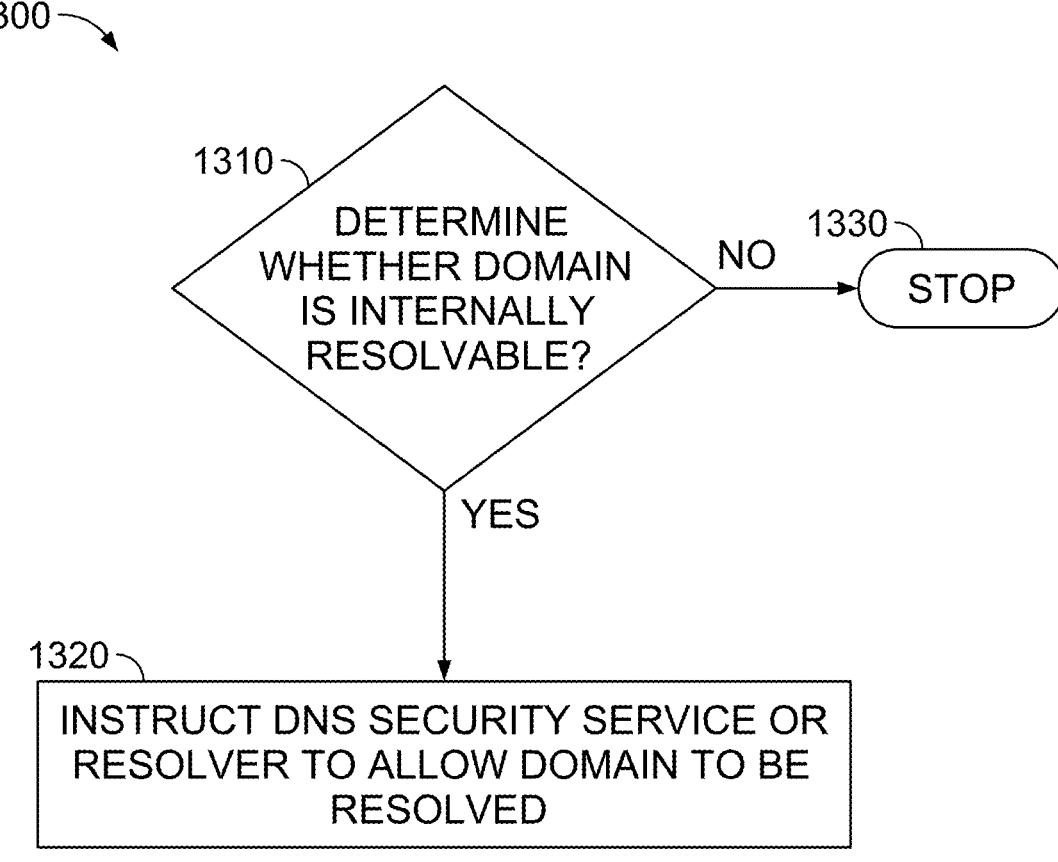
FIG. 13 is a flow diagram illustrating a process for performing an internal resolvability check for a domain in accordance with some embodiments.

FIG. 13 is a flow diagram illustrating a process for performing an internal resolvability check for a domain in accordance with some embodiments. In some embodiments, the process 1300 is an implementation of operation 1040 of FIG. 10 and comprises:

In 1310, the cloud security service determines whether a domain is internally resolvable.

In 1320, in response to a determination that the domain is internally resolvable, the cloud security service instructs a DNS security service or resolver to allow the domain to be resolved. By allowing the domain to be resolved, a client can access internal services.

In 1330, in response to a determination that the domain is not internally resolvable, the cloud security service stops the process.

Figure 14:
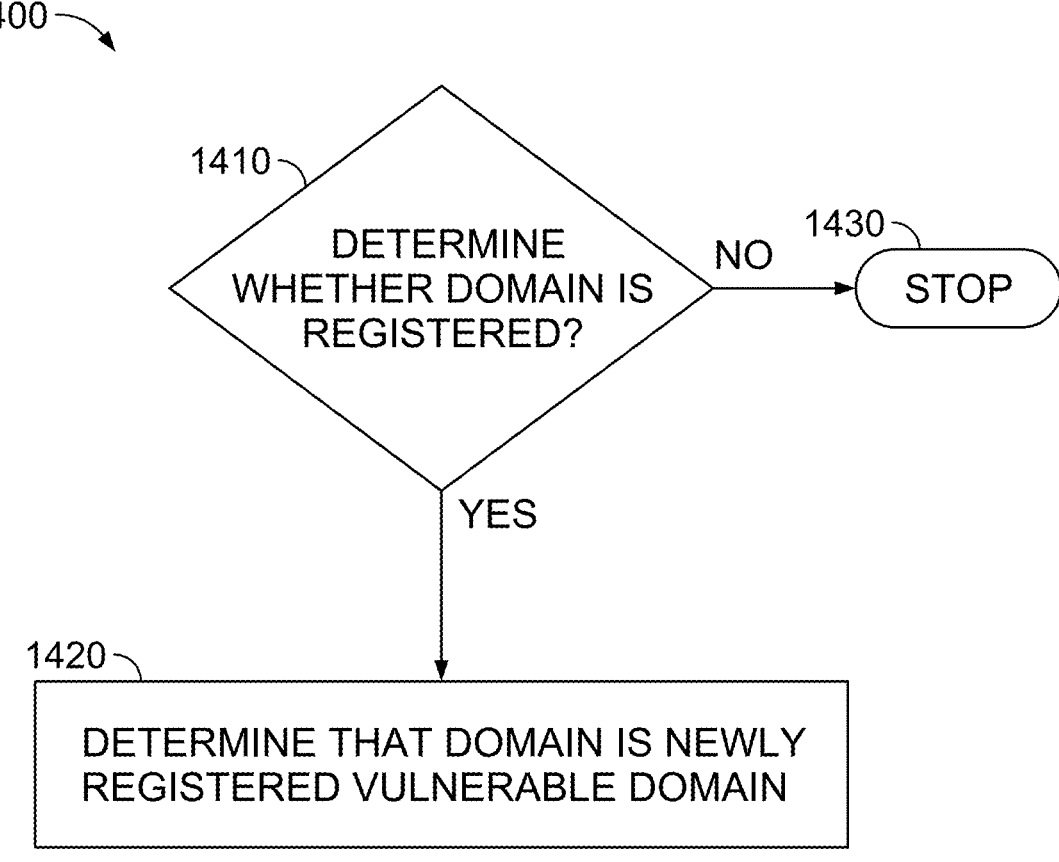
FIG. 14 is a flow diagram illustrating a process for performing a registration check for a domain in accordance with some embodiments.

FIG. 14 is a flow diagram illustrating a process for performing a registration check for a domain in accordance with some embodiments. In some embodiments, the process 1400 is an implementation of operation 1050 of FIG. 10 and comprises:

In 1410, the cloud security service determines whether a domain is registered.

In 1420, in response to a determination that the domain is registered, the cloud security service determines that the domain is a newly registered vulnerable domain.

In 1430, in response to a determination that the domain is not registered, the cloud security service stops the process.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled to the processor and configured to provide the processor with instructions, when executed by the processor, to:
    monitor network activity using a network security device;
    detect that a session is querying a claimable non-existent domain (NXDOMAIN) using a domain name system (DNS) security service, wherein the detecting that the session is querying the claimable NXDOMAIN comprises to:
        perform a high impact check, comprising to:
            check a server-side source to identify a high impact NXDOMAIN; and
            check a client-side source to identify a high impact NXDOMAIN, wherein the client-side source includes a telemetry log for determining domains having more than N customers or M visits, and/or a passive DNS log for determining domains having more than N customers or M visits, wherein N corresponds to a first positive integer, wherein M corresponds to a second positive integer; and perform an action in response to the session querying the claimable NXDOMAIN.

2. The system of claim 1, wherein the server-side source includes a telemetry log, a passive DNS log, a DNS zone file, or any combination thereof.

3. The system of claim 1, wherein the client-side source includes an email domain list and/or a Whois database for determining recently expired domains.

4. The system of claim 1, wherein the detecting that the session is querying the claimable NXDOMAIN comprises to:
    perform a claimability check for a candidate claimable NXDOMAIN.

5. The system of claim 1, wherein the detecting that the session is querying the claimable NXDOMAIN comprises to:
    perform an internal resolvability check for a candidate claimable NXDOMAIN.

6. The system of claim 1, wherein the detecting that the session is querying the claimable NXDOMAIN comprises to:
    perform a registration check for a candidate claimable NXDOMAIN.

7. The system of claim 1, wherein the claimable NXDOMAIN includes a root domain that is not registered or claimed and/or a rentable subdomain that is not registered or claimed.

8. The system of claim 1, wherein the action includes one or more of the following: block query, block a response to the claimable NXDOMAIN, alert an administrator, quarantine a source device querying the claimable NXDOMAIN, log a source device que rying the claimable NXDOMAIN, and/or register the claimable NXDOMAIN.

9. A method, comprising:
monitoring network activity using a network security device;
detecting that a session is querying a claimable non-existent domain (NXDOMAIN) using a domain name system (DNS) security service, wherein the detecting that the session is querying the claimable NXDOMAIN comprises:
    performing a high impact check, comprising:
        checking a server-side source to identify a high impact NXDOMAIN; and
        checking a client-side source to identify a high impact NXDOMAIN, wherein the client-side source includes a telemetry log for determining domains having more than N customers or M visits, and/or a passive DNS log for determining domains having more than N customers or M visits, wherein N corresponds to a first positive integer, wherein M corresponds to a second positive integer; and
performing an action in response to the session querying the claimable NXDOMAIN.

10. The method of claim 9, wherein the server-side source includes a telemetry log, a passive DNS log, a DNS zone file, or any combination thereof.

11. The method of claim 9, wherein the client-side source includes an email domain list and/or a Whois database for determining recently expired domains.

12. The method of claim 9, wherein the detecting that the session is querying the claimable NXDOMAIN comprises:
    performing a claimability check for a candidate claimable NXDOMAIN.

13. The method of claim 9, wherein the detecting that the session is querying the claimable NXDOMAIN comprises:

performing an internal resolvability check for a candidate claimable NXDOMAIN.

14. The method of claim 9, wherein the detecting that the session is querying the claimable NXDOMAIN comprises:

performing a registration check for a candidate claimable NXDOMAIN.

15. The method of claim 9, wherein the action includes one or more of the following: block query, block a response to the claimable NXDOMAIN, alert an administrator, quarantine a source device querying the claimable NXDOMAIN, log a source device querying the claimable NXDOMAIN, and/or register the claimable NXDOMAIN.

16. A computer program product embodied in a nontransitory computer readable medium and comprising computer instructions for:

monitoring network activity using a network security device;

detecting that a session is querying a claimable nonexistent domain (NXDOMAIN) using a domain name system (DNS) security service, wherein the detecting that the session is querying the claimable NXDOMAIN comprises:

performing a high impact check, comprising:

checking a server-side source to identify a high impact NXDOMAIN; and checking a client-side source to identify a high impact NXDOMAIN, wherein the client-side source includes a telemetry log for determining domains having more than N customers or M visits, and/or a passive DNS log for determining domains having more than N customers or M visits, wherein N corresponds to a first positive integer, wherein M corresponds to a second positive integer; and performing an action in response to the session querying the claimable NXDOMAIN.

* * * * *